(12) United States Patent
Ryan, Jr. et al.

(10) Patent No.: US 6,531,244 B1
(45) Date of Patent: Mar. 11, 2003

(54) BATTERY ADAPTER DEVICE

(76) Inventors: William R. Ryan, Jr., 8314 Golden Chickasaw Cr, Orlando, FL (US) 32825; Mildred J. Ryan, 8314 Golden Chickasaw Cr, Orlando, FL (US) 32825

( * ) Notice: Subject to any disclaimer, the term of this patent is extended or adjusted under 35 U.S.C. 154(b) by 186 days.

(21) Appl. No.: 09/636,611

(22) Filed: Aug. 11, 2000

(51) Int. Cl.[7] .................................................. H01M 2/10
(52) U.S. Cl. .......................................... 429/100; 429/96
(58) Field of Search ................................. 429/96, 100

(56) References Cited

U.S. PATENT DOCUMENTS

| | | |
|---|---|---|
| 5,246,790 A | 9/1933 | Mooney et al. |
| 3,969,148 A * | 7/1976 | Trattner ..................... 429/100 |
| 3,990,919 A | 11/1976 | Kruger |
| 4,724,189 A | 2/1988 | Chase |
| 4,767,358 A * | 8/1988 | Nullmeyer et al. ......... 439/500 |
| 4,806,440 A | 2/1989 | Hahs, Jr. et al. |
| 5,240,787 A | 8/1993 | Goldschmidt et al. |
| D409,560 S | 5/1999 | Shim |

FOREIGN PATENT DOCUMENTS

JP          10-144273     *  5/1998   ............ H01M/2/10

* cited by examiner

*Primary Examiner*—Patrick Ryan
*Assistant Examiner*—Julian Mercado

(57) ABSTRACT

A battery adapter device for providing flexibility in the choice of batteries for powering electrical and electronic devices. The battery adapter device includes a container member having a size which is adapted to be generally equivalent to a larger conventional cell battery and being adapted to replace the larger cell battery in devices energized with larger cell batteries; and also includes a support assembly for supporting a conventional AA battery in the container member.

11 Claims, 2 Drawing Sheets

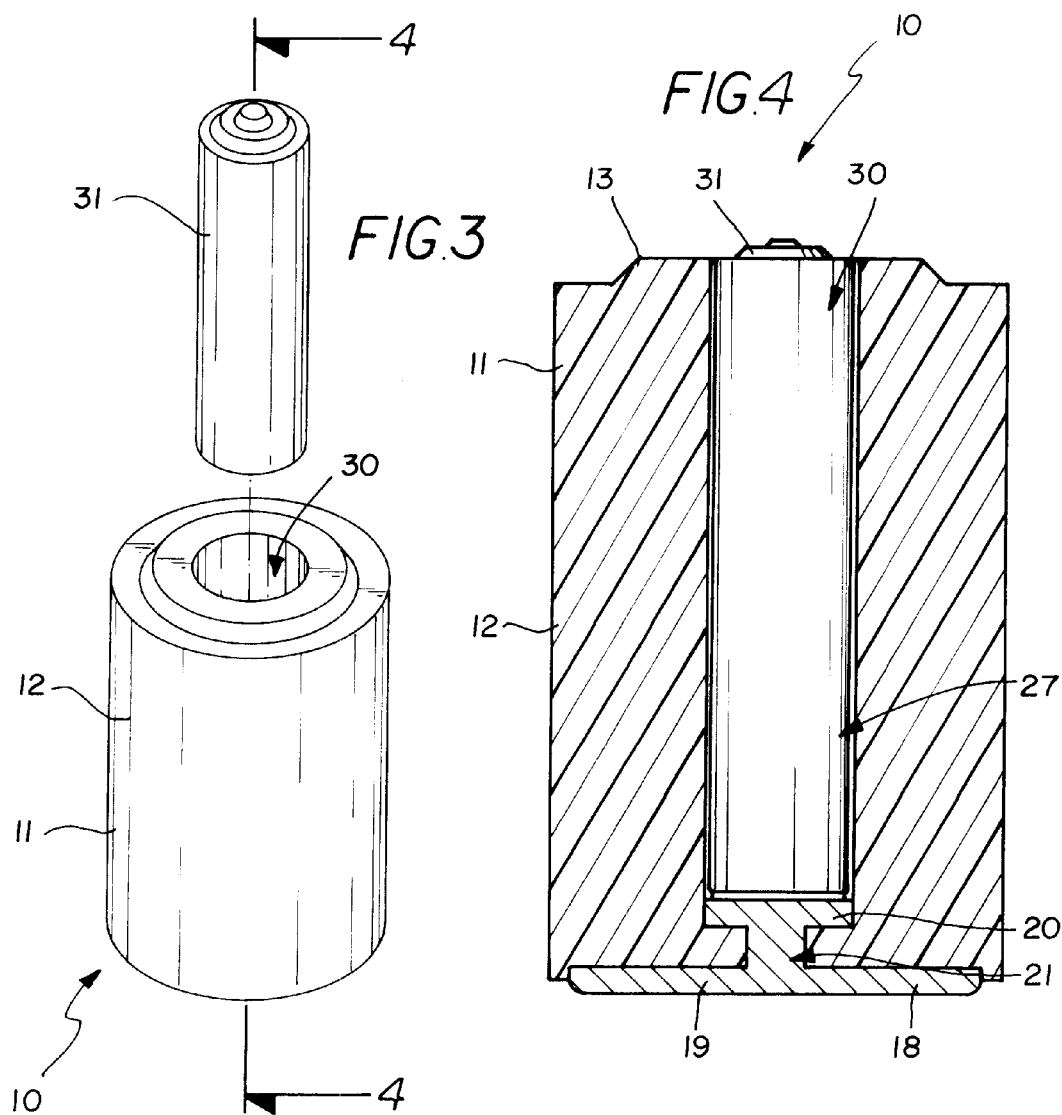

BATTERY ADAPTER DEVICE

BACKGROUND OF THE INVENTION

1. Field of the Invention

The present invention relates to a battery exchanger and more particularly pertains to a new battery adapter device for providing flexibility in the choice of batteries for powering electrical and electronic devices.

2. Description of the Prior Art

The use of a battery exchanger is known in the prior art. More specifically, a battery exchanger heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,990,919; U.S. Pat. No. 5,246,790; U.S. Pat. No. 5,240,787; U.S. Pat. No. 4,806,440; U.S. Pat. No. 4,724,189; and U.S. Pat. No. Des. 409,560.

While these devices fulfill their respective, particular objectives and requirements, the aforementioned patents do not disclose a new battery adapter device. The inventive device includes a container member having a size which is adapted to be generally equivalent to a larger conventional cell battery and being adapted to replace the larger cell battery in devices energized with larger cell batteries; and also includes a support assembly for supporting a conventional AA battery in the container member.

In these respects, the battery adapter device according to the present invention substantially departs from the conventional concepts and designs of the prior art, and in so doing provides an apparatus primarily developed for the purpose of providing flexibility in the choice of batteries for powering electrical and electronic devices.

SUMMARY OF THE INVENTION

In view of the foregoing disadvantages inherent in the known types of battery exchanger now present in the prior art, the present invention provides a new battery adapter device construction wherein the same can be utilized for providing flexibility in the choice of batteries for powering electrical and electronic devices.

The general purpose of the present invention, which will be described subsequently in greater detail, is to provide a new battery adapter device which has many of the advantages of the battery exchanger mentioned heretofore and many novel features that result in a new battery adapter device which is not anticipated, rendered obvious, suggested, or even implied by any of the prior art battery exchanger, either alone or in any combination thereof.

To attain this, the present invention generally comprises a container member having a size which is adapted to be generally equivalent to a larger conventional cell battery and being adapted to replace the larger cell battery in devices energized with larger cell batteries; and also includes a support assembly for supporting a conventional AA battery in the container member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new battery adapter device which has many of the advantages of the battery exchanger mentioned heretofore and many novel features that result in a new battery adapter device which is not anticipated, rendered obvious, suggested, or even implied by any of the prior art battery exchanger, either alone or in any combination thereof.

It is another object of the present invention to provide a new battery adapter device which may be easily and efficiently manufactured and marketed.

It is a further object of the present invention to provide a new battery adapter device which is of a durable and reliable construction.

An even further object of the present invention is to provide a new battery adapter device which is susceptible of a low cost of manufacture with regard to both materials and labor, and which accordingly is then susceptible of low prices of sale to the consuming public, thereby making such battery adapter device economically available to the buying public.

Still yet another object of the present invention is to provide a new battery adapter device which provides in the apparatuses and methods of the prior art some of the advantages thereof, while simultaneously overcoming some of the disadvantages normally associated therewith.

Still another object of the present invention is to provide a new battery adapter device for providing flexibility in the choice of batteries for powering electrical and electronic devices.

Yet another object of the present invention is to provide a new battery adapter device which includes a container member having a size which is adapted to be generally equivalent to a larger conventional cell battery and being adapted to replace the larger cell battery in devices energized with larger cell batteries; and also includes a support assembly for supporting a conventional AA battery in the container member.

Still yet another object of the present invention is to provide a new battery adapter device that allows a user to freely substitute smaller batteries for larger batteries.

Even still another object of the present invention is to provide a new battery adapter device that is easy and convenient to use especially when the user only has AA batteries for use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of a second embodiment of the present invention.

FIG. 4 is a cross-sectional view of the second embodiment of the present invention.

DESCRIPTION OF THE PREFERRED EMBODIMENT

Figure 1:
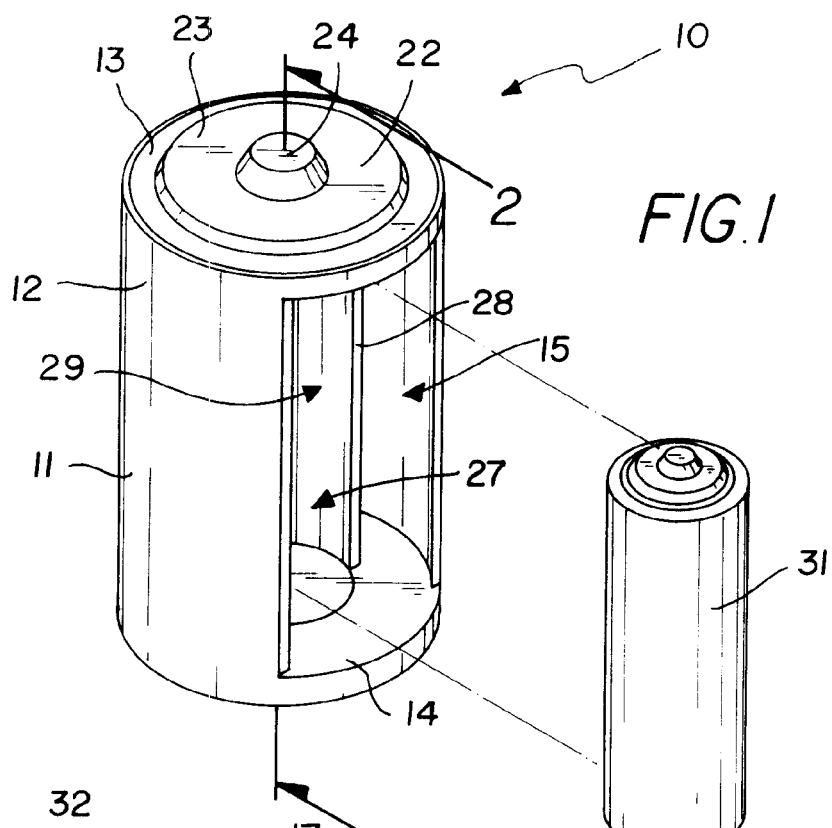
FIG. 1 is a perspective view of a first embodiment of a new battery adapter device according to the present invention.
Figure 2:
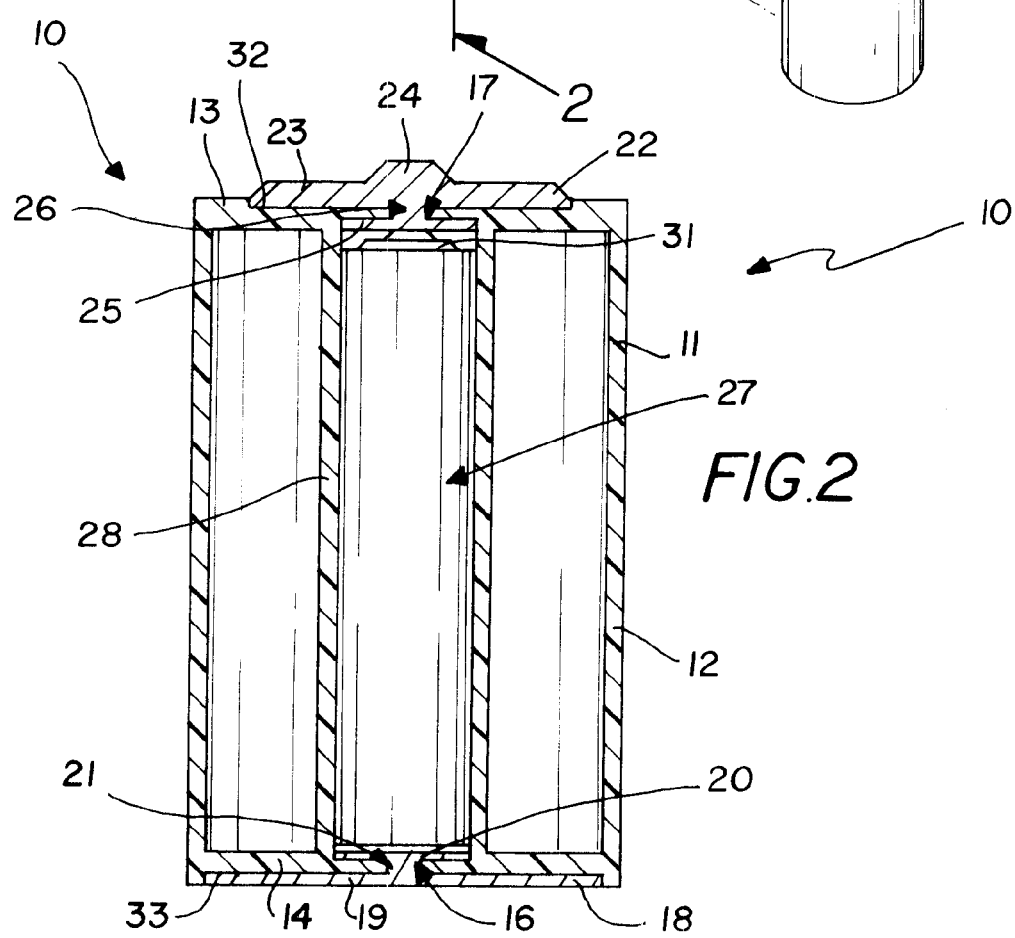
FIG. 2 is a cross-sectional view of the first embodiment of the present invention.

With reference now to the drawings, and in particular to FIGS. 1 through 4 thereof, a new battery adapter device embodying the principles and concepts of the present invention and generally designated by the reference numeral 10 will be described.

As best illustrated in FIGS. 1 through 4, the battery adapter device 10 generally comprises a container member 11 having a size which is adapted to be generally equivalent to a larger conventional cell battery and being adapted to replace the larger cell battery in devices energized with such larger cell batteries. The container member 11 is generally a cylindrical member having a negative terminal contact member 18 securely and conventionally disposed at an end thereof with the negative terminal contact member 18 being securely attached to a second end wall 14 of the container member 11 and having a main portion 19 and a battery contact portion 20 extending from a top side of the main portion 19 and extending in the container member 11 and being adapted to be in contact with a battery 31 removably disposed in the container member 11. The battery contact portion 20 has a circumferentially-extending groove 21 disposed in a wall thereof. The container member 11 has a second end wall 14 having a hole 16 centrally disposed therethrough. An edge forming the hole 16 is received in the circumferentially-extending groove 21 to securely retain the negative terminal contact member 18. The second end wall 14 has a recessed portion 33 which is adapted to receive the main portion 19 of the negative terminal contact member 18 with the main portion 19 of the negative terminal contact member 18 being essentially flush with the second end wall 14 of the container member 11. As a first embodiment, the container member 11 has an opening 15 in a side wall 12 thereof and further has a positive terminal contact member 22 securely and conventionally disposed at another end of the container member 11.

Means for supporting a conventional AA battery 31 in the container member 11 includes an inner compartment 27 defined by a cylindrical side wall 28 which is securely and conventionally disposed in the container member 11 and -being securely attached to the ends of the container member 11. The cylindrical side wall 28 has an opening 29 therethrough with the opening 29 being in alignment with the opening 15 in the container member 11 and with the inner compartment 27 being adapted to removably receive the conventional AA battery 31. The positive terminal contact member 22 is securely attached to a first end wall 13 of the container member 11 and has a main 23 portion, a boss-like portion 24 centrally disposed upon and extending from a top side of the main portion 23, and a battery contact portion 24 extending from a bottom side of the main portion 23 and extending in the inner compartment 27. The battery contact portion 25 of the positive terminal contact member 22 has a circumferentially-extending groove 26 disposed in a wall thereof with the first end wall 13 having a hole 17 centrally disposed therein. An edge of the hole of the first end wall 13 is received in the circumferentially-extending groove 26 of the positive terminal contact member 22 for securely retaining the positive terminal contact member 22.

As a second embodiment, the means for supporting a conventional AA battery 31 in the container member 11 includes a bore 30 extending in the container member 11 through the first end wall 13 thereof and forming an inner compartment 27 which is adapted to receive the AA battery 31 therein. The battery contact portion 20 of the negative terminal contact member 18 is disposed in the inner compartment 27.

In use, the user places a AA battery 31 in the inner compartment 27 of the container member 11 and places the battery adapter device 10 in an electronic device which normally uses the larger cell battery such as D and C cell batteries to energize the particular electronic device.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A battery adapter device for permitting a first size battery having a relatively smaller diameter to replace a second size battery having a relatively larger diameter in an electrical device, said device comprising:

a container member having a diameter size which is substantially equal to the diameter of the second size battery;

a supporting means for supporting a battery of the first size battery in an interior of said container member;

wherein said container member has a pair of end walls for each positioning adjacent to contacts of the electrical device, and a side wall extending between said end walls, an opening being formed in said side wall thereof, said opening extending substantially a length of said container between said end walls for permitting removal and reinstallation in said container member while said container member is positioned in the electrical device for accessing said supporting means such that the battery is accessible when positioned in said supporting means and said container is positioned in an electrical device.

2. A battery adapter device as described in claim 1, wherein said container member is a substantially cylindrical member having a negative terminal contact member securely disposed at one of said end walls thereof.

3. A battery adapter device as described in claim 2, wherein said negative terminal contact member is securely attached to a second said end wall of said container member and has a main portion and a battery contact portion extending from a top side of said main portion and extending in said container member and being adapted to be in contact with a battery removably disposed in said container member, said battery contact portion having a circumferentially-extending groove disposed in a wall thereof.

4. A battery adapter device as described in claim 3, wherein said second end wall has a hole centrally disposed therethrough, an edge forming said hole being located in said circumferentially-extending groove to securely retain said negative terminal contact member.

5. A battery adapter device as described in claim 4, wherein said second end wall has a recessed portion which is adapted to receive said main portion of said negative terminal contact member, said main portion of said negative terminal contact member being essentially flush with said second end wall of said container member.

6. A battery adapter device as described in claim 5, wherein said container member has a positive terminal contact member securely disposed at another end of said container member.

7. A battery adapter device as described in claim 6, wherein said supporting means includes an inner compartment defined by a cylindrical side wall which is securely disposed in said container member and being securely attached to said ends of said container member, said cylindrical side wall having an opening therethrough, said opening in said cylindrical side wall being in alignment with the opening in the container member, said inner compartment being adapted to removably receive the first size battery.

8. A battery adapter device as described in claim 7, wherein said positive terminal contact member is securely attached to a first said end wall of said container member and has a main portion, a boss-like portion centrally disposed upon extending from a top side of said main portion, and a battery contact portion extending from a bottom side of said main portion and extending in said inner compartment, said battery contact portion having a circumferentially-extending groove disposed in a wall thereof.

9. A battery adapter device as described in claim 8, wherein said container member has a first end wall having a hole centrally disposed therein, an edge of said hole of said first end wall being received in said circumferentially-extending groove of said positive terminal contact member for securely retaining said positive terminal contact member.

10. A battery adapter device as described in claim 5, wherein said supporting means includes a bore extending in said container member through a first end wall thereof and forming an inner compartment which is adapted to receive the battery therein, said battery contact portion of said negative terminal contact member being disposed in said inner compartment.

11. A battery adapter device for permitting a first size battery having a relatively smaller diameter to replace a second size battery having a relatively larger diameter in an electrical device, said device comprising:

a container member having a diameter size which is substantially equal to the diameter of the second size battery, said container member being a substantially cylindrical member having a negative terminal contact member securely disposed at one of said end walls thereof, said negative terminal contact member being securely attached to a second said end wall of said container member and having a main portion and a battery contact portion extending from a top side of said main portion and extending in said container member and being adapted to be in contact with a battery removably disposed in said container member, said battery contact portion having a circumferentially-extending groove disposed in a wall thereof, said second end wall having a hole centrally disposed therethrough, an edge forming said hole being located in said circumferentially-extending groove to securely retain said negative terminal contact member, said second end wall having a recessed portion being adapted to receive said main portion of said negative terminal contact member, said main portion of said negative terminal contact member being essentially flush with said second end wall of said container member, said container member having a positive terminal contact member securely disposed at another end of said container member;

a supporting means for supporting a battery of the first size battery in an interior of said container member, said supporting means including an inner compartment defined by a cylindrical side wall which is securely disposed in said container member and being securely attached to said ends of said container member, said cylindrical side wall having an opening therethrough;

said container member having a pair of end walls each for positioning adjacent to contacts of the electrical device, and a side wall extending between said end walls, an opening being formed in said side wall thereof, said opening extending substantially a length of said container between said end walls for permitting removal and reinstallation in said container member while said container member is positioned in the electrical device for accessing said supporting means such that the battery is accessible when positioned in said supporting means and said container is positioned in an electrical device, said opening in said cylindrical side wall being in alignment with the opening in the container member, said inner compartment being adapted to removably receive the first size battery;

said positive terminal contact member being securely attached to a first said end wall of said container member and having a main portion, a boss-like portion centrally disposed upon and extending from a top side of said main portion, and a battery contact portion extending from a bottom side of said main portion and extending in said inner compartment, said battery contact portion having a circumferentially-extending groove disposed in a wall thereof; and said container member having a first end wall having a hole centrally disposed therein, an edge of said hole of said first end wall being received in said circumferentially-extending groove of said positive terminal contact member for securely retaining said positive terminal contact member.

* * * * *